(12) United States Patent
Schouwink

(10) Patent No.: US 9,204,618 B2
(45) Date of Patent: Dec. 8, 2015

(54) DEVICE FOR TRANSPORTING AN ANIMAL IN A VEHICLE

(71) Applicant: Marco Schouwink, Harderwijk (NL)

(72) Inventor: Marco Schouwink, Harderwijk (NL)

( * ) Notice: Subject to any disclaimer, the term of this patent is extended or adjusted under 35 U.S.C. 154(b) by 150 days.

(21) Appl. No.: 13/890,025

(22) Filed: May 8, 2013

(65) Prior Publication Data

US 2013/0298843 A1    Nov. 14, 2013

(30) Foreign Application Priority Data

May 9, 2012  (NL) ..................................... 1039589

(51) Int. Cl.
*A01K 1/02* (2006.01)
*B65D 5/36* (2006.01)

(52) U.S. Cl.
CPC ............ *A01K 1/0272* (2013.01); *A01K 1/0245* (2013.01); *B65D 5/365* (2013.01)

(58) Field of Classification Search
CPC . A01K 1/0272; A01K 1/0125; A01K 1/0245; A01K 1/0281; B65D 5/445; B65D 5/0055; B65D 5/16; B65D 5/3621; B65D 5/3628; B65D 5/3642; B65D 5/365; B65D 5/3678; B65D 5/48015; B65D 5/566
USPC ......... 119/512, 513, 514, 482, 771, 496, 498, 119/499; 229/117.01, 117.03, 117.04
See application file for complete search history.

(56) References Cited

U.S. PATENT DOCUMENTS

| | | | |
|---|---|---|---|
| 2,292,540 A | | 8/1942 | Norton |
| 2,381,067 A | * | 8/1945 | Lowey ..................... 229/117.04 |
| 3,039,670 A | * | 6/1962 | Hardon ....................... 206/521.8 |
| 4,411,373 A | * | 10/1983 | Kupersmit ..................... 229/199 |
| 4,512,286 A | * | 4/1985 | Rux ............................... 119/771 |
| 5,005,526 A | * | 4/1991 | Parker ........................... 119/751 |
| 5,133,294 A | * | 7/1992 | Reid ............................. 119/771 |
| 5,497,729 A | | 3/1996 | Lord |
| 5,572,951 A | * | 11/1996 | Evans et al. ................... 119/168 |
| 5,762,261 A | * | 6/1998 | Okabe et al. ............. 229/117.08 |
| 5,765,504 A | | 6/1998 | Evans et al. |
| 5,839,392 A | * | 11/1998 | Pemberton et al. ........... 119/498 |

(Continued)

FOREIGN PATENT DOCUMENTS

| | | |
|---|---|---|
| GB | 1274337 | 5/1972 |
| JP | 1039589 | 4/2002 |

OTHER PUBLICATIONS

Dutch Patent Office, Search Report for priority application NL 1039589, Jan. 8, 2013.

*Primary Examiner* — Yvonne Abbott-Lewis
(74) *Attorney, Agent, or Firm* — Shewchuk IP Services, LLC; Jeffrey D. Shewchuk

(57) ABSTRACT

A folding device having a rectangular bottom transports an animal such as a dog.
In the unfolded state, upright first and second side walls are connected on the long sides and short sides of the bottom.
Fold lines in the second side walls facilitate folding of the device from the unfolded state to the folded state and the bottom is divided into bottom portions by a fold line running parallel with the long sides to facilitate folding the device from the unfolded state to the folded state. Rigidity-providing wall portions are provided at the location of at least one of the corners, which stiffness-providing wall portions can be secured to the second side walls, which stiffness-providing wall portions are hingable about an axis transverse to the rectangular bottom at the location of the relevant corner for increasing the stiffness of the second side walls.

20 Claims, 4 Drawing Sheets

(56) References Cited

U.S. PATENT DOCUMENTS

| | | | |
|---|---|---|---|
| 5,915,680 A * | 6/1999 | Umemura et al. | 27/4 |
| 6,092,716 A * | 7/2000 | Smith | 229/117.04 |
| 6,592,025 B2 * | 7/2003 | Bazany et al. | 229/199 |
| 6,698,382 B1 * | 3/2004 | Blaszak et al. | 119/168 |
| D555,293 S * | 11/2007 | Gourkow | D30/108 |
| 8,631,766 B2 * | 1/2014 | Frasier et al. | 119/496 |
| 8,651,062 B2 * | 2/2014 | Arsenault | 119/497 |
| 2008/0156275 A1 | 7/2008 | Lam | |

* cited by examiner

DEVICE FOR TRANSPORTING AN ANIMAL IN A VEHICLE

The present invention relates to a device for transporting an animal, which device may be in a folded and a folded-out state, and the device comprises a rectangular bottom with
two long sides of length L;
two short sides with width B, and
corners
and the device comprises in the unfolded state upright first and second side walls that are connected on the long sides and short sides of the bottom with the rectangular bottom, which side walls of the bottom comprise a remote upper edge and at the peripheral edges of the rectangular bottom an adjoining lower edge, wherein
the long sides of the bottom are provided with first side walls with a length L;
the short sides of the bottom are provided with second side walls having a width B, and
the second side walls comprise fold lines to facilitate folding of the device from the unfolded state to the folded state and the bottom is divided into bottom portions by a fold line running parallel with the long sides to facilitate folding the device from the unfolded state to the folded state.

Such a device is known in the art from U.S. Pat. No. 5,839,392. That device is suitable for transporting a relatively small pet with a car.

The object of the invention is to provide an alternative device that is at least suitable for transporting a larger animal by car, such as a dog with a shoulder height of more than 40 cm, and still can be easily changed between a folded-out (i.e. unfolded) state for use and a collapsed (i.e. folded) state for storage condition.

To this end, a device according to the preamble is characterized in that at each short side of the device rigidity-providing wall portions are provided at the location of at least one of the corners, which stiffness-providing wall portions can be secured to the second side walls, which stiffness-providing wall portions are hingable about an axis transverse to the rectangular bottom at the location of the relevant corner;

which stiffness-providing wall portions in a folded-out state of the device in which they are turned to the second side walls and are secured to the second side walls maintain the device in the unfolded state by increasing the stiffness of the second side walls, and in a folded state are turned to the first side walls and are located between the first side walls and the bottom portions adjacent to the first side walls.

The hingable wall portions are generally at least as rigid, preferably more rigid than the side walls. The device according to the invention has an odd number of fold lines (one or more) in the bottom, so that the number of bottom portions is even, or in other words, there are one or more pairs of bottom portions. Of a pair of bottom portions the width is equal, but if there are more pairs of bottom portions, the pairs of bottom portions do not have to have the same width. The bottom portions of a pair may be separated from each other by one or more pairs of further bottom portions. The side walls will have a height H and the width of a bottom portion adjacent to a first side wall will have a width of not less than H. In the device according to the invention, the bottom may be of relatively thick (e.g., 1 cm thick) material, such as a foam-filled material. This is comfortable for the animal that is being transported with the device. However, the device can be folded compactly, thanks to the second side walls which are thin in comparison with the bottom. The flexible material of the second side walls is, for example, cloth or a plastic sheet, such as PVC. Relatively thick and/or rigid bottom elements will be mutually connected by means of a zone of relatively flexible material.

According to a preferred embodiment, at least a section of one of the side walls is releasably securable to the rest of the device for providing an access opening to the device.

In general, only the section can be folded back and forms an integral part of the device. However, it is conceivable that the section or the whole side wall can be taken off. For example, the side wall comprising the at least partially releasable section comprises separating means running from an upper edge in the direction of the bottom, such as zippers or co-operating Velcro members. Thus an opening may be formed and an animal can have easy access to the device. Furthermore, the releasable section may be put at least partially outside the back of a vehicle such as a station wagon on the bumper. As a result, where the releasable section covers the bumper, the latter can not be damaged by nails or the like of the animal.

According to a preferred embodiment, the section is provided with a fold line which is arranged parallel with the long sides of the rectangular bottom smoothly, and can be secured in a state folded back onto itself.

Thus, the device becomes a basket with lowered entry, which is very practical when the animal has reached its destination.

According to a preferred embodiment, a first side wall is provided with a support adjustable in length which on either side of the device can protrude beyond the second side walls.

The support is, for example a rod. This makes it possible to secure the device in a vehicle, in particular, between the side walls of the cargo space of a vehicle such as a station wagon, by supporting the ends of the rod against the inner sides of the vehicle. Thus, the device remains in place easily. Furthermore, the device will be in an upright position against the rear seats of the vehicle when in the folded state, and thus cause only limited inconvenience (i.e. little area of the floor of the cargo space is occupied) when other cargo is to be transported by car.

According to a preferred embodiment, the device comprises an outer surface of a moisture-resistant material.

Thus, the device can be easily cleaned. The moisture-resistant material will be a plastic material, such as PVC.

According to a preferred embodiment, it comprises on the bottom a moisture-absorbent, textile cover.

Thus a comfortable surface for the animal to be transported can be provided and, furthermore, moisture released by the animal can be absorbed. Such a cover is preferably detachably secured to the device, so that the cover can be detached and washed.

According to a preferred embodiment, the bottom comprises at an underside of the bottom facing away from the side walls a skid-resisting material.

Thus, the device can be prevented from slipping inside the cargo space. For use in a cargo space that is lined with a felt, non-woven or other fibrous material a hook-and-loop hook material may be provided at the underside of the bottom of the device, that provides a suitable adhesion to the material in the cargo space. Other suitable non-slip materials are, for example, rubber or non-woven material. Advantageously, a combination of at least two of rubber, Velcro-hook, and non-woven material is used, so that the device, in essence, is appropriate for any support surface (e.g. cargo space floor).

According to a preferred embodiment, the device comprises an organ for holding, in a folded state of the device, the first side walls in a fixed state relative to each other.

Thus the chance is reduced that when the device is in a folded state partially unfolds by shocks of the vehicle. The organ is formed, for example by cooperating Velcro strips.

According to a favourable embodiment, the rectangular bottom comprises more than one pair of bottom portions.

Thus, a device according to the invention can be relatively wide, without this being at the expense of the foldability. Then, only the thickness of the device in the collapsed state increases, which dimension if it increases gives no significantly hindrance in practice, because the cargo space is not significantly reduced. The width of bottom portions which are not adjacent to the first side portion will be less than or equal to the width of a bottom portion that is adjacent to a first side wall.

The present invention will now be illustrated with reference to the drawing where FIG. 1 shows a perspective view of a device for transporting an animal, in an unfolded state of the device;

Figure 1:
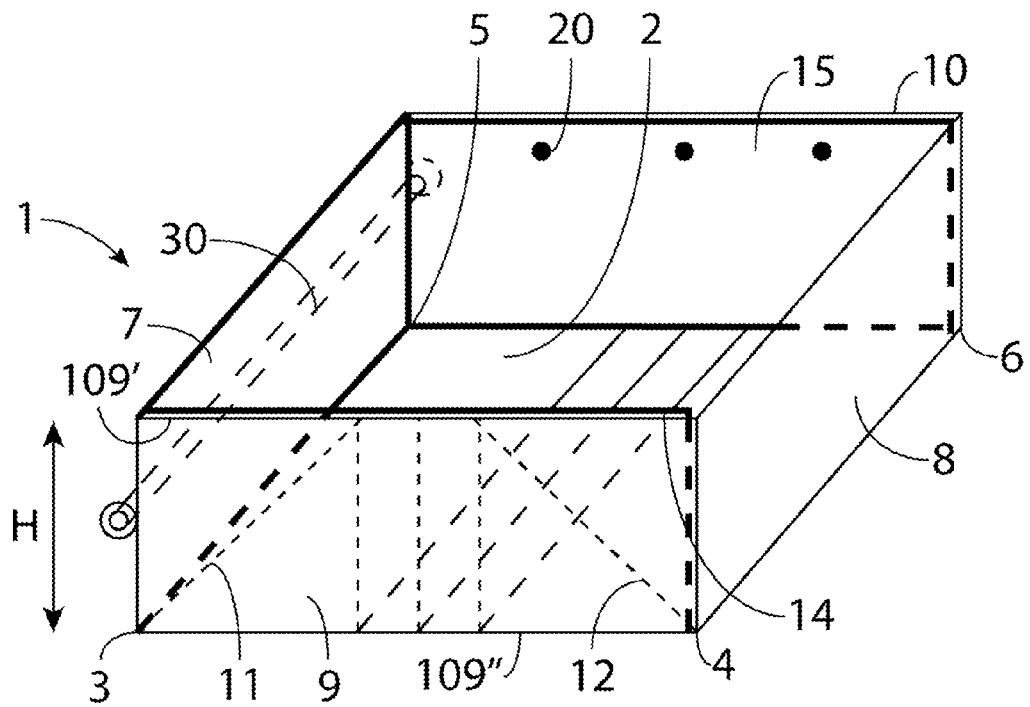
Figure 5:
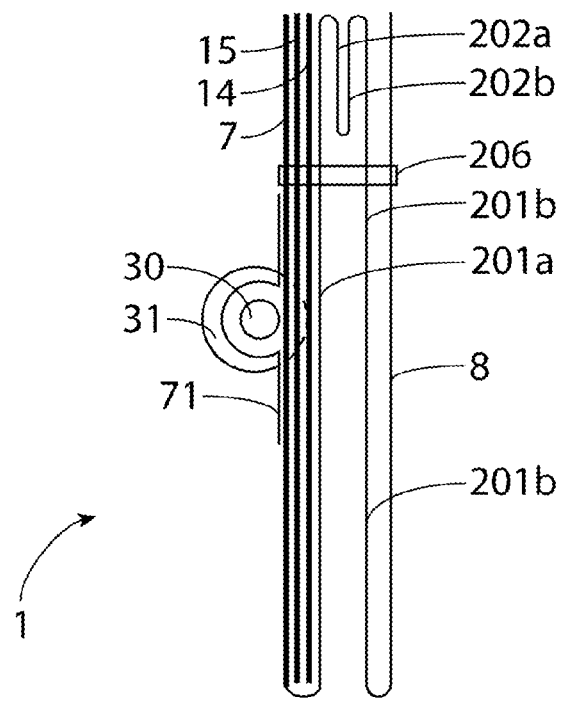
FIG. 5 shows a side view of the device of FIG. 1 in the folded state thereof.

FIG. 1 shows a perspective view of a device 1 for the transport of an animal such as a dog, the device 1 capable of being in an unfolded state as shown here, or in a collapsed state (FIG. 5). The device comprises a rectangular bottom 2 provided with two opposed first side walls 7 and 8, which in the unfolded state of the device 1 are standing up from the rectangular bottom 2. The first side wall 7 is a rear wall 7 of the device 1. The first side wall 8 is a front wall 8 of the device 1. The device 1 also comprises two opposite second side walls 9, 10, which are side walls of the device 1. The side walls are fixedly connected to the bottom 2 to long lower edges and short bottom edges, respectively (bottom edge 109" is indicated for side wall 9).

The side walls 9, 10 have fold lines 11, 12 extending from corners 3, 4, 5, 6 at 45° towards the upper edge (upper edge 109' indicated for side wall 9) of the respective side walls. The function of these folding lines 11, 12 will be explained later in connection with FIG. 4.

Figure 2:
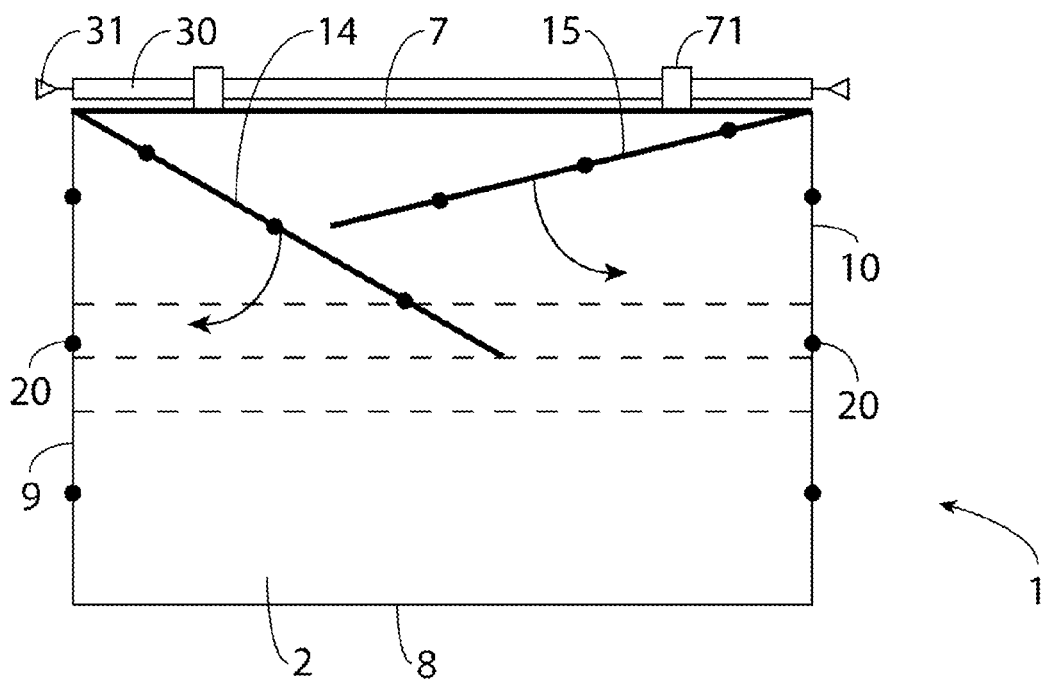
FIG. 2 shows a top view of the device of FIG. 1 during the transition from an folded state to an unfolded state of the device.

FIG. 2 shows a top view of the device 1 while it is being changed from a collapsed state to a folded-out state. The side walls 9, 10 are upright, and will be made stiffer by means of wall portions 14, 15. These wall portions 14, 15 are hingable about the corners 3, 5. In practice, the side walls 7, 9 and 7, 10 will be stitched together with the wall portions 14, 15 at an upright longitudinal edge. The wall portions 14, 15 are fastened by means of push buttons 20 or Velcro to the second side walls 9, 10, so that the stiffness increases in such a way that the device 1 maintains its folded-out shape. Since the push buttons hold hair less in the invention these are preferred over Velcro.

The rear wall 7 is provided with a telescopic rod 30 with feet 31, wherein the rod 30 is held by loops 71 stitched to the rear wall 7. These feet 31 will be used to press against the inside of a vehicle as a result of which the device 1 remains in place during driving. The back wall 7 will be facing the back of the seats of the vehicle. To change the length of the rod, the feet may be provided with threaded rods.

Figure 3:
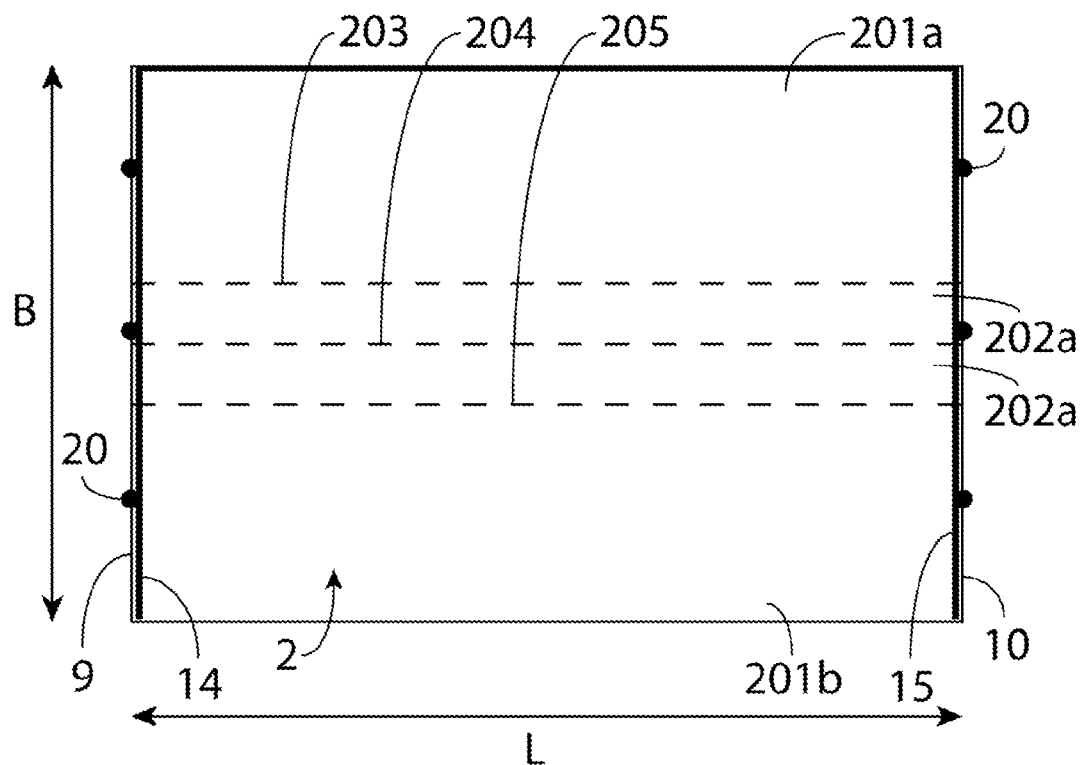
FIG. 3 shows a top view of the device of FIG. 1 in the unfolded state thereof.

FIG. 3 shows a top view of the device 1. A first pair of bottom portions 201a, 201b is visible separated by a second pair of bottom portions 202a, 202b having a smaller width. The total width of the bottom portions 201, 202 is B, and for example, 1 meter. The bottom portions 201, 202 are defined by a three fold lines 203, 204, 205 which run parallel to the long sides of the bottom 2 (of length L).

Figure 4:
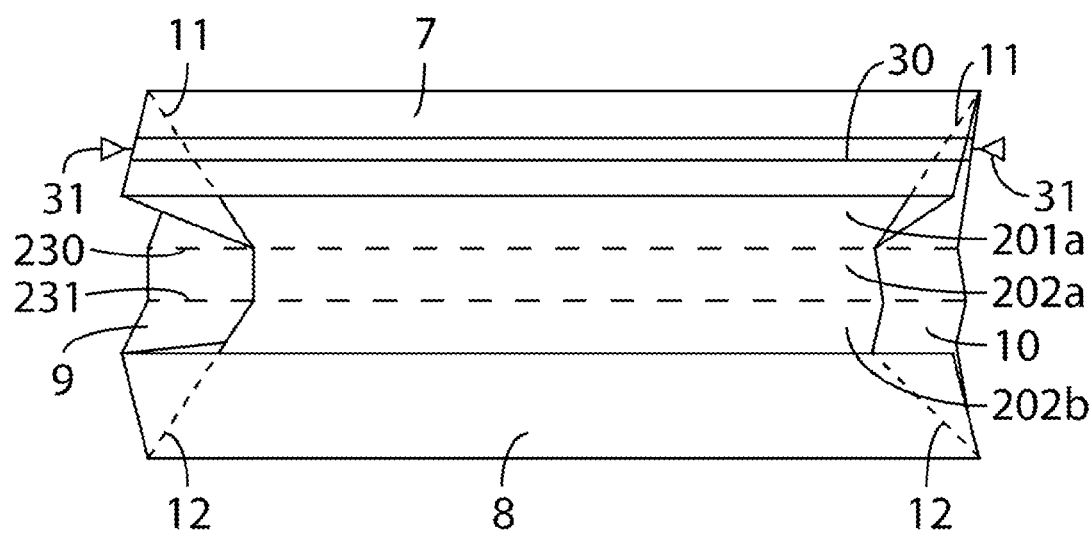
FIG. 4 shows a perspective top view when the device of FIG. 1 is passed from the collapsed state to the folded-out state.

FIG. 4 shows a perspective top view of the device 1 according to the invention, when it is passed from the unfolded state to the folded state. The side walls 9, 10 are located against the bottom 2, and are folded about the fold lines 11, 12. In the embodiment shown, possessing two pairs of bottom portions 201, 202, there are also additional fold lines 230, 231, 232 (see also FIG. 6) which in the folded-out condition run vertical.

FIG. 5 shows a side view of the device 1 in the folded state. If the device 1 has been clamped by means of the telescopic rod 30 inside a car, the device 1 will be hardly occupying surface area of the cargo space, since the device 1 is upright. A Velcro strip 206 may be used to temporarily connect the first side walls 7, 8 with each other, as a result of which the front wall 8 does not fall forward.

Figure 6:
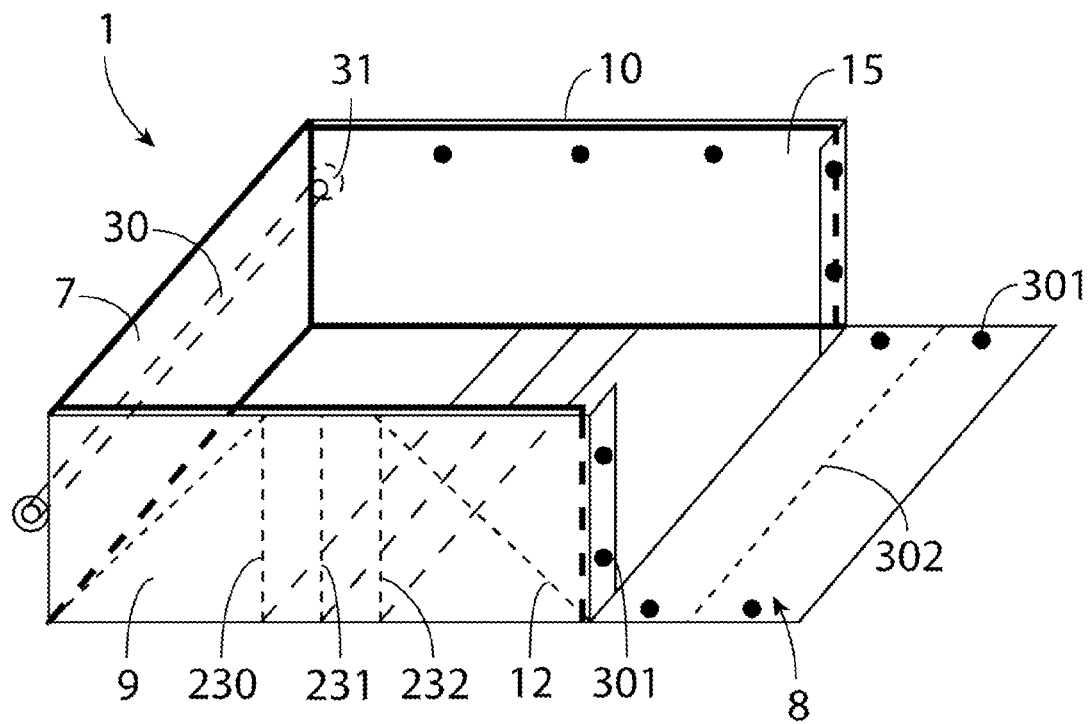
FIG. 6 shows a perspective view of the device of FIG. 1 with open front wall.

FIG. 6 corresponds substantially to FIG. 1. In the embodiment shown here, the front wall 8 is releasably secured to the second side walls 9, 10 by means of snap fasteners 301. Thus, an animal can enter in the device 1 easily. The front wall 8 may cover the cargo floor and/or the bumper of the car, as a result of which that will not become dirty and/or damaged.

The front wall 8 comprises a fold line 302, and the front wall 8 can be folded back onto itself.

Figure 7:
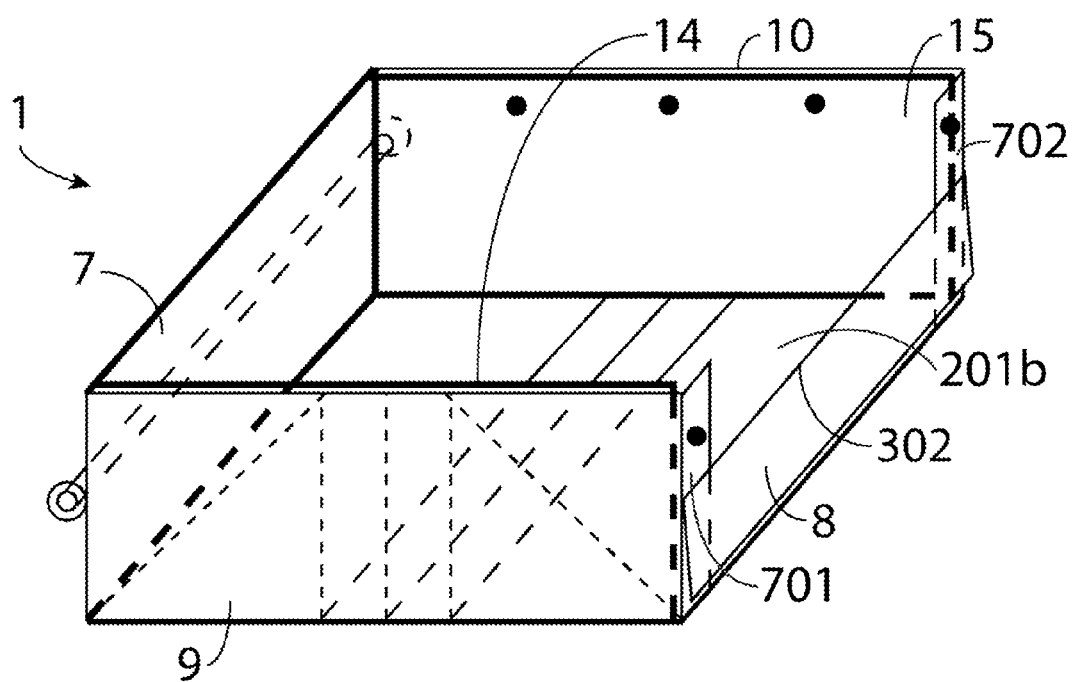
FIG. 7 shows a perspective view of the device of FIG. 1 with a folded wall for lowered entry.

FIG. 7 shows a perspective view of the device of FIG. 1 with a front wall 8 that is double-folded about fold line 302, wherein the bottom portion 201b connected to lower half of front wall 8 is secured by means of push buttons 301 to flaps 701, 702 of the second side walls 9, 10, the flaps being bent at an angle of 90°. The bottom portion 201b of the remote half of the front wall 8 is hanging down freely under the influence of the force of gravity. As a result, the device 1 as shown in FIG. 1 and FIG. 6 is transformed into a basket with lowered entry as shown in FIG. 7.

The invention claimed is:

1. A device for transportation of an animal, which device can be repeatedly reconfigured between a folded and a folded-out state, and the device comprises a rectangular bottom with two long sides of length L;
two short sides with width B, and
corners and the device comprises in the unfolded state upright first and second side walls that are connected on the long sides and short sides of the bottom with the rectangular bottom, which side walls of the bottom comprise a remote upper edge and at the peripheral edges of the rectangular bottom an adjoining lower edge, wherein the long sides of the bottom are provided with first side walls with a length L;
the short sides of the bottom are provided with second side walls having a width B, and the second side walls comprise fold lines to facilitate folding of the device from the unfolded state to the folded state and the bottom is divided into bottom portions by a fold line running parallel with the long sides to facilitate folding the device from the unfolded state to the folded state, characterized in that at each short side of the device rigidity-providing wall portions are provided at the location of at least one of the corners, which stiffness-providing wall portions can be secured to the second side walls, which stiffness-providing wall portions are hingable about an axis transverse to the rectangular bottom at the location of the relevant corner; which stiffness-providing wall portions in a folded-out state of the device in which they are turned to the second side walls and are secured to the second side walls maintain the device in the unfolded state by increasing the stiffness of the second side walls, and in a folded state are turned to the first side walls and are located between the first side walls and the bottom portions adjacent to the first side walls.

2. The animal transportation device according to claim 1, wherein at least a section of one of the side walls is releasably securable to the rest of the device for providing an access opening to the device.

3. The animal transportation device according to claim 2, wherein the section is provided with a fold line which is arranged parallel with the long sides of the rectangular bottom smoothly, and can be secured in a state folded back onto itself.

4. The animal transportation device according to claim 2, wherein the releasably securable section of one of the side walls is securable to the rest of the device with snap fasteners.

5. The animal transportation device according to claim 2, wherein the releasably securable section of one of the side walls is securable to the rest of the device along edges which extend generally transverse to the rectangular bottom, with releasing of the edges permitting the releasably securable section to pivot downward on a fold line at a side of the bottom so the releasably securable section extends in the plane of the rectangular bottom.

6. The animal transportation device according to claim 1, wherein a first side wall is provided with a support adjustable in length which on either side of the device can protrude beyond the second side walls.

7. The animal transportation device according to claim 1, wherein the device comprises an outer surface of a moisture-resistant material.

8. The animal transportation device according to claim 1, wherein it comprises on the bottom a moisture-absorbent, textile cover.

9. The animal transportation device according to claim 1, wherein the bottom comprises at an underside of the bottom facing away from the side walls a skid-resisting material.

10. The animal transportation device according to claim 1, wherein the device comprises a holder for holding, in a folded state of the device, the first side walls in a fixed state relative to each other.

11. The animal transportation device according to claim 1, wherein the rectangular bottom comprises more than one pair of bottom portions.

12. The animal transportation device according to claim 1, further comprising releasable fasteners on the stiffness-providing wall portions which mate with mating releasable fasteners on the second side walls, so during use when transporting an animal the stiffness-providing wall portions can be releasably fastened to the second side walls.

13. The animal transportation device according to claim 12, wherein the releasable fasteners are push buttons.

14. The animal transportation device according to claim 12, wherein the releasable fasteners are hook-and-loop type fasteners.

15. The animal transportation device according to claim 1, wherein the stiffness-providing wall portions are made of a stiffer material than the second side walls.

16. The animal transportation device according to claim 15, wherein the second side walls are formed of cloth.

17. The animal transportation device according to claim 15, wherein the second side walls are formed of flexible plastic sheet material.

18. The animal transportation device according to claim 1, wherein the are first side walls and the second side walls are stitched to the stiffness-providing wall portions at the hingable connection.

19. The animal transportation device according to claim 1, wherein the rectangular bottom is formed of a thicker material than the second side walls and than the stiffness-providing wall portions.

20. The animal transportation device according to claim 19, wherein the rectangular bottom is formed of a foam-filled material.

* * * * *